(12) United States Patent
Liu et al.

(10) Patent No.: US 11,279,111 B2
(45) Date of Patent: Mar. 22, 2022

(54) AIR EXHAUST OR AIR-AND-SMOKE EXHAUST PIPE FOR CLEAN ROOM AND MANUFACTURING METHOD THEREFOR

(71) Applicant: Bamstone New Material Technology (Wuhan) Co., Ltd., Wuhan (CN)

(72) Inventors: Wei Liu, Changzhou (CN); Chang-Tzu Yu, Changzhou (CN); Jiuxiao Sun, Changzhou (CN)

(73) Assignee: BAMSTONE NEW MATERIAL TECHNOLOGY (WUHAN) CO., LTD., Wuhan (CN)

( * ) Notice: Subject to any disclaimer, the term of this patent is extended or adjusted under 35 U.S.C. 154(b) by 688 days.

(21) Appl. No.: 16/074,082

(22) PCT Filed: Sep. 30, 2017

(86) PCT No.: PCT/CN2017/104716
§ 371 (c)(1),
(2) Date: Jul. 31, 2018

(87) PCT Pub. No.: WO2019/061378
PCT Pub. Date: Apr. 4, 2019

(65) Prior Publication Data
US 2020/0208003 A1    Jul. 2, 2020

(30) Foreign Application Priority Data
Sep. 28, 2017 (CN) .......................... 201710899097.8

(51) Int. Cl.
| | |
|---|---|
| *B32B 15/00* | (2006.01) |
| *B05D 3/02* | (2006.01) |
| *B05D 3/06* | (2006.01) |
| *B05D 7/22* | (2006.01) |
| *C09D 5/08* | (2006.01) |
| *C09D 5/18* | (2006.01) |
| *C09D 127/12* | (2006.01) |
| *C09D 183/04* | (2006.01) |
| *F16L 58/10* | (2006.01) |
| *B32B 15/08* | (2006.01) |
| *B32B 15/082* | (2006.01) |

(52) U.S. Cl.
CPC ............ *B32B 15/00* (2013.01); *B05D 3/0272* (2013.01); *B05D 3/061* (2013.01); *B05D 7/222* (2013.01); *B32B 15/08* (2013.01); *B32B 15/082* (2013.01); *C09D 5/08* (2013.01); *C09D 5/18* (2013.01); *C09D 127/12* (2013.01); *C09D 183/04* (2013.01); *F16L 58/1009* (2013.01); *B05D 2202/10* (2013.01); *B05D 2202/25* (2013.01); *B05D 2202/45* (2013.01); *Y10T 428/139* (2015.01); *Y10T 428/1352* (2015.01); *Y10T 428/1355* (2015.01)

(58) Field of Classification Search
CPC .......... C09D 127/12; C09D 5/08; C09D 5/18; C09D 183/04; B32B 15/08; B32B 15/082; B32B 15/00; B05D 3/0272; B05D 3/061; B05D 7/222; B05D 2202/10; B05D 2202/25; B05D 2202/45; B05D 2401/30; B05D 2602/00; B05D 2506/10; B05D 2518/12; B05D 2503/00; B05D 7/146; F16L 58/1009; F16L 58/1027; C08G 77/80; Y10T 428/1355; Y10T 428/139; Y10T 428/1352
See application file for complete search history.

(56) References Cited

U.S. PATENT DOCUMENTS

| | | | |
|---|---|---|---|
| 5,383,994 A | 1/1995 | Shea | |
| 2005/0005990 A1 | 1/2005 | Williams et al. | |

FOREIGN PATENT DOCUMENTS

| | | | |
|---|---|---|---|
| CN | 101074342 A | 11/2007 | |
| CN | 101787244 A | 7/2010 | |
| CN | 101891993 A | 11/2010 | |
| CN | 107163254 A | 9/2017 | |
| EP | 0458322 A2 | 11/1991 | |
| EP | 1943314 B1 | 8/2015 | |

*Primary Examiner* — James C Yager
(74) *Attorney, Agent, or Firm* — Bayramoglu Law Offices LLC

(57) ABSTRACT

The present invention provides an air exhaust or air-and-smoke exhaust pipe for a clean room and a manufacturing method thereof. The air exhaust or air-and-smoke exhaust pipe is a pipe that satisfies FM4922, FM4910, or another equivalent standard and that is used for exhausting nonflammable chemical gas and corrosive vapor or nonflammable chemical gas, corrosive vapor and smoke in fire. The manufacturing method for the air exhaust or air-and-smoke exhaust pipe is: coating an inner part of a pre-manufactured metal pipe with a liquid coating that can be initially dried at normal temperature or low temperature to obtain an inner coating pipe; and baking the inner coating pipe at a temperature not exceeding 250° C. after the coating is initially dried, thus the coating is completely dried to obtain a finished product.

14 Claims, No Drawings

AIR EXHAUST OR AIR-AND-SMOKE EXHAUST PIPE FOR CLEAN ROOM AND MANUFACTURING METHOD THEREFOR

CROSS REFERENCE TO RELATED APPLICATIONS

This application is the national phase entry of International Application No. PCT/CN2017/104716, filed on Sep. 30, 2017, which is based upon and claims priority to Chinese Application No. CN201710899097.8, filed on Sep. 28, 2017, the entire contents of which are incorporated herein by reference.

TECHNICAL FIELD

The present invention relates to an air exhaust or air-and-smoke exhaust pipe for a clean room and a manufacturing method thereof, and belongs to the field of macromolecule and building material technologies.

BACKGROUND

An air exhaust or air-and-smoke exhaust pipe for a clean room needs to be certified by an FM 4922 standard, and a material thereof needs to be certified by an FM 4910 standard. Currently, pipes that can satisfy requirements of the FM 4922 standard and the FM 4910 standard mainly include the following several forms:

A first form is a fiberglass reinforced composite pipe that is represented by the European patent EP0458322A2 and the U.S. Pat. No. 5,383,994 and whose lining layer is a corrosion-resistant resin matrix such as a vinyl resin and outer structural layer is a flame-retardant resin matrix such as a phenolic resin.

A second form is a coated metal pipe manufactured by using a powder coating such as ECTFE and ETFE. A pipe body of such pipe is usually manufactured by using a stainless steel material, an inner part is coated with a fluoric powder coating such as ECTFE, ETFE, and PTFE, and the pipe is molded through highbake. No valid patent is seen for the method. The US patent U.S. 20050005990 is actually a variation of the method, and a pipe is manufactured by using a metal panel whose lining is a fluoroplastic film. The patent is not granted.

For the first product, powder is easily generated during cutting, mounting is not facilitated enough; the vinyl resin used for the lining layer of the first product contains halogen, and a poisonous gas is easily generated after burning. Therefore, the first product has been less used. On the market, the second form is selected for mainstream products. When fire happens, the fluoropolymer powder coating is easily decomposed after being heated to generate a poisonous fluoric gas. In addition, an inner wall of the metal pipe is coated by using the powder coating, causing difficulty in construction. Moreover, the powder coating whose main component is the fluoropolymer has a high construction temperature. For example, a coating temperature required by the ECTFE is approximately 275° C., a coating temperature required by the ETFE is approximately 315° C., and a coating temperature required by the PTFE is higher. A relatively high construction temperature not only causes relatively high costs and relatively low construction efficiency, but also greatly wastes energy.

SUMMARY

An objective of the present invention is to provide an air exhaust or air-and-smoke exhaust pipe for a clean room. The pipe has features of corrosion resistance and flame retardance, and can pass FM 4922 and FM 4910 tests.

Another objective of the present invention is to provide a manufacturing method for an air exhaust or air-and-smoke exhaust pipe for a clean room. The method is easy in construction, and has a low construction temperature and therefore is easy in operations.

To achieve the foregoing objectives, the technical solutions are used in the present invention:

An air exhaust or air-and-smoke exhaust pipe for a clean room is manufactured by using a metal and a coating on a surface of the metal, where the coating includes a first component and/or a second component, wherein the first component is a coating using methyl, ethyl, and phenyl siloxane, methyl polysilicate methyl ester, a perfluoroalkyl siloxane monomer, homopolymer, and copolymer, and a combination thereof as a basic film former; and the second component is a coating using a copolymer of fluorinated alkene and vinyl ether and a homopolymer of fluorinated (methyl) acrylate or a copolymer with another monomer as a basic film former.

A polymer having an F—C structure has good characteristics of corrosion resistance, flame retardance, high temperature resistance, and no stickiness, and is quite suitable for being used as a coating of an air exhaust or air-and-smoke exhaust metal pipe for a clean room. Therefore, the stainless steel lining Teflon powder coating can be a mainstream material of an air exhaust or air-and-smoke exhaust pipe for a clean room. An existing fluoropolymer is difficult to be dissolved into a solvent to form a solution or dispersed into water to form an emulsion. Therefore, construction can only be performed by using a powder coating, resulting in a disadvantage of difficulty in construction. Therefore, in this application, a raw material form is changed in the premise of maintaining a basic molecular structure of the fluoropolymer. A copolymer of fluorinated alkene and vinyl ether is selected as a basic film former to form a liquid coating. Because hydroxyl and carboxyl functional groups are introduced, the polymer can be desirably dissolved into a ketone or ester solvent or the like to form a solution, thereby facilitating a coating process.

Further, the fluorinated alkene is any one or more of chlorotrifluor ethylene, tetrafluoroethylene, polyvinylidene fluoride, vinyl fluoride, hexafluoropropylene, trifluoroethylene, trifluorobromoethylene, trifluoropropene, hexafluoroisobutene, and octafluoroisobutylene.

Further, the coating further contains isocyanate. After the isocyanate is added, hydroxyl on a chain of the polymer reacts with the isocyanate, to form a three-dimensional mesh structure. Fluoropolymer molecules used for a lining powder coating of an existing pipe is of a linear structure and is easy to be decomposed after being heated, to generate a poisonous gas. After the fluoropolymer is appropriately crosslinked through reaction with the isocyanate, a capability of heat decomposition resistance can be improved.

A high-molecular polymer having a Si—C bond has similar characteristics of high temperature resistance, corrosion resistance, flame retardance, and no stickiness as that of the fluoropolymer, and a decomposition product of the high-molecular polymer is innoxious. Therefore, the high-molecular polymer is an ideal material used for improving the coating of the air exhaust or air-and-smoke exhaust pipe for a clean room.

Chemically or physically combining the polymer having a Si—C bond and the polymer having an F—C bond is also an effective approach of improving the coating of the air exhaust or air-and-smoke exhaust pipe for a clean room.

In addition, the F—C polymer, the Si—C polymer, and inorganic filler powder that are not dissolved into a solvent or difficult to be dispersed into water to form an emulsion may further be dispersed into the solvent or emulsion to from a turbid liquid, to improve the coating performance.

Further, the air exhaust or air-and-smoke exhaust pipe for a clean room described in this application satisfies requirements of FM4922, FM4910, or an equivalent standard.

Further, the metal is iron, aluminum, copper, and an alloy thereof.

This application also discloses a method for manufacturing the air exhaust or air-and-smoke exhaust pipe for a clean room, including the following steps:

(1) preforming a metal into a pipe of a required shape or structure, and carrying out surface treatment on the pipe;

(2) at normal temperature, coating an inner part of the preformed metal pipe with a liquid coating;

(3) at normal temperature, leaving the preformed pipe in a natural state for a period of time or irradiating the preformed pipe with ultraviolet light to make a coating touch-dry and hard-dry; and (4) leaving the preformed pipe for a relatively long time at normal temperature or baking the preformed pipe at a temperature not higher than 250° C., to postcure the coating to obtain a finished product.

The normal temperature herein and in this application is a temperature in a natural environment.

Further, a coating is liquid during coating construction, and can be a solution, an emulsion, a solvent-free liquid mixture, or suspensoid containing solid powder.

Further, coating and touch dry temperatures of the coating are not higher than 35° C.

Preferably, the postcure method in step 4 is placing the pipe into a baking oven or a baking room, or introducing hot air into the pipe.

DETAILED DESCRIPTION OF THE EMBODIMENTS

The present invention is further described below in detail with reference to specific implementations. The "part" described in the embodiments of the present invention indicate mass fraction unless particularly specified.

Embodiment 1

100 parts of a 60% butanone solution (LUMIFLON® LF200MEK, purchased from Asahi in Japan) of a copolymer of fluorinated alkene and vinyl ether are taken, 1 part of a thixotropic agent (purchased from HDK® H18 in Wacker) is added, and the solution and the thixotropic agent are uniformly dispersed in a sand mill as component A. Polymeric MDI (purchased from Bayer 44V20) is component B.

Degreasing and drying treatment are carried out on an inner part of a 304 stainless steel pipe of a specification required by a corrosion resistance test, a horizontal pipe combustion test, a vertical/horizontal pipe combustion test, and a vertical pipe combustion test, and then the pipe is prepared for use. The component A and the component B are taken and uniformly mixed by weight ratio of 100:7-8, and is sprayed on an inner wall of the 304 stainless steel pipe prepared for use. After a coating is touch-dry, the pipe is after treated in a baking oven of 80° C. for four hours and then is taken out. After the pipe is cooled down to a normal temperature, a chemical-corrosion resistance test and a fire resistance test are performed.

Embodiment 2

100 parts of an organic silicon resin (purchased from SILRES® MSE 100 in Wacker) are taken, 1 part of a thixotropic agent (purchased from HDK® H13L in Wacker) is added, and the organic silicon resin and the thixotropic agent are uniformly dispersed in a sand mill as component A of a coating. Tetrabutyl titanate is component B of the coating.

Degreasing and drying treatment are carried out on an inner part of a 304 stainless steel pipe of a specification required by a corrosion resistance test, a horizontal pipe combustion test, a vertical/horizontal pipe combustion test, and a vertical pipe combustion test, and then the pipe is prepared for use. The component A and the component B of the coating are taken and uniformly mixed by weight ratio of 100:3-6, and is sprayed on an inner wall of the 304 stainless steel pipe prepared for use. After the coating is touch-dry, the pipe is aftertreated in a baking oven of 80° C. for four hours and then is taken out. After the pipe is cooled down to a normal temperature, a chemical-corrosion resistance test and a fire resistance test are performed.

Embodiment 3

100 parts of a 60% butanone solution (LUMIFLON® LF200MEK, purchased from Asahi in Japan) of a copolymer of fluorinated alkene and vinyl ether are taken, 20 parts of ECTFE powder (purchased from SOLVAY) are added, and the solution and the CTFE powder are uniformly dispersed in a sand mill as component A of a coating. Polymeric MDI (purchased from Bayer 44V20) is component B of the coating.

Degreasing and drying treatment are carried out on an inner part of a 304 stainless steel pipe of a specification required by a corrosion resistance test, a horizontal pipe combustion test, a vertical/horizontal pipe combustion test, and a vertical pipe combustion test, and then the pipe is prepared for use. The component A and the component B of the coating are taken and uniformly mixed by weight ratio of 100:5-6, and is sprayed on an inner wall of the 304 stainless steel pipe prepared for use. After the coating is touch-dry, the pipe is after treated in a baking oven of 80° C. for four hours and then is taken out. Hot air of 250° C. is blew into the pipe for 20 minutes by using an air heater for further aftertreatment. After the pipe is cooled down to a normal temperature, a chemical-corrosion resistance test and a fire resistance test are performed.

Embodiment 4

100 parts of an organic silicon resin (purchased from SILRES® MSE 100 in Wacker) are taken, 20 parts of ECTFE powder (purchased from SOLVAY) are added, and the organic silicon resin and the ECTFE powder are uniformly dispersed in a sand mill as component A of a coating. Tetrabutyl titanate is component B of the coating.

Degreasing and drying treatment are carried out on an inner part of a 304 stainless steel pipe of a specification required by a corrosion resistance test, a horizontal pipe combustion test, a vertical/horizontal pipe combustion test, and a vertical pipe combustion test, and then the pipe is prepared for use. The component A and the component B of the coating are taken and uniformly mixed by weight ratio of 100:2.5-5, and is sprayed on an inner wall of the 304 stainless steel pipe prepared for use. After the coating is touch-dry, the pipe is after treated in a baking oven of 80°

C. for four hours and then is taken out. Hot air of 250° C. is blew into the pipe for 20 minutes by using an air heater for further aftertreatment. After the pipe is cooled down to a normal temperature, a chemical-corrosion resistance test and a fire resistance test are performed.

Chemical-corrosion resistance test:

At 25° C., an inner surface of the pipe prepared in each of the foregoing embodiments is immersed in each the following media for eight hours, and then is removed and cleaned.

1 #medium: 75% sulfuric acid

2 #medium: 30% hydrochloric acid

3 #medium: a mixture of 30% hydrochloric acid and 30% hydrogen peroxide whose volume ratio is 1:1

4 #medium: saturated ammonia

After the foregoing reagents are treated, disadvantages and destruction are tested by using a microscope, and it is detected, by using an electrospark tester, whether there is leakage on a coating on the inner surface of the pipe.

Testing results are as follows:

| Sample name | 1# medium | 2# medium | 3# medium | 4# medium |
| --- | --- | --- | --- | --- |
| Embodiment 1 | Coating completed and no leakage | Coating completed and no leakage | Coating completed and no leakage | Coating completed and no leakage |
| Embodiment 2 | Coating completed and no leakage | Coating completed and no leakage | Coating completed and no leakage | Coating completed and no leakage |
| Embodiment 3 | Coating completed and no leakage | Coating completed and no leakage | Coating completed and no leakage | Coating completed and no leakage |
| Embodiment 4 | Coating completed and no leakage | Coating completed and no leakage | Coating completed and no leakage | Coating completed and no leakage |

Fire resistance test:

The fire resistance test is performed according to the FM 4922 *Certification Standards of Air Exhaust Pipe or Air-and-Smoke Exhaust Pipe.*

In the horizontal pipe combustion test, a straight pipe whose diameter is 12 inches and horizontal length is 24 feet is placed on a testing apparatus. A combustion source is placed on one end of the pipe, a fan is mounted on the other end of the pipe, and flame is lit up and is sucked into the pipe. If all the following conditions are satisfied in a testing process for 15 minutes, the product performance is considered as being qualified:

1. Flame in the pipe cannot extend to a place away from a flame exposure end by 23 ft (7.0 m).

2. A temperature at a place of 23 ft (7.0 m) inside the pipe cannot exceed 1000° F. (538° C.).

3. If the pipe and/or a mounting connector cannot maintain a complete structure, there is no burny or glowing particle after a dropped, dripped, or a melted pipe part or connector material gets into contact with the floor.

4. No external burning is caused due to autoignition or temperature transfer inside the pipe. When burning of an external surface is caused during exposure to external flame, the flame should intermittently appear and cannot spread outside a range of the first connector that is away from the exposure end by 4 ft (1.2 m).

In the horizontal/vertical pipe combustion test, a 90° bent pipe whose diameter is 12 inches, vertical length is 15 feet, and horizontal length is 24 feet is placed on a testing apparatus. A combustion source is placed on one end of the pipe, a fan is mounted on the other end of the pipe, and flame is lit up and is sucked into the pipe. If all the following conditions are satisfied in a testing process for 15 minutes, the product performance is considered as being qualified:

1. Flame in the pipe cannot spread to a place on a horizontal pipe segment away from a flame exposure end by 23 ft (7.0 m).

2. Flame outside the pipe should be limited to a vertical pipe segment, and cannot spread to an external surface on the horizontal pipe segment.

3. A temperature at a place of 23 ft (7.0 m) inside the pipe cannot exceed 1000° F. (538° C.).

4. If the pipe and/or a mounting connector cannot maintain a complete structure, there is no burny or glowing particle after a dropped, dripped, or a melted pipe part or connector material gets into contact with the floor.

In the vertical pipe combustion test, a straight pipe whose diameter is 12 inches and vertical length is 15 feet is placed on a testing apparatus. A combustion source is placed on one end of the pipe, a fan is mounted on the other end of the pipe, and flame is lit up and is sucked into the pipe. If all the following conditions are satisfied in a testing process for 15 minutes, the product performance is considered as being qualified:

1. Flame in the pipe cannot spread to a range within 10 ft (3.1 m) from a top end of the pipe.

2. Flame outside the pipe cannot spread to a range within 5 ft (1.6 m) from the top end of the pipe.

3. A temperature inside the pipe measured at a place away from the top end of the pipe by 1 ft (0.3 m) cannot exceed 1000° F. (538° C.).

4. If the pipe and/or a mounting connector cannot maintain a complete structure, there is no burny or glowing particle after a dropped, dripped, or a melted pipe part or connector material gets into contact with the floor.

Testing results are as follows:

| Sample name | Horizontal pipe test | Horizontal/ vertical pipe test | Vertical pipe test |
| --- | --- | --- | --- |
| Embodiment 1 | Qualified | Qualified | Qualified |
| Embodiment 2 | Qualified | Qualified | Qualified |
| Embodiment 3 | Qualified | Qualified | Qualified |
| Embodiment 4 | Qualified | Qualified | Qualified |

Although the implementations of the present invention are described in this specification, these implementations are merely used as presentations and should not limit the protection scope of the present invention. Various omissions, replacements, and changes made without departing from the scope of the present invention should all fall within the protection scope of the present invention.

What is claimed is:

1. A method for manufacturing an exhaust pipe for a clean room comprising the following steps:
    (i) preforming a metal into a pipe of a required shape or structure to define a preformed metal pipe, and carrying out surface treatment on the pipe;
    (ii) coating an inner part of the preformed metal pipe with a coating of a first component and a coating of a second component at a normal temperature, wherein the second component comprises a copolymer of a fluorinated alkene and vinyl ether and a homopolymer of fluorinated methyl acrylate as a second basic film former;
    (iii) allowing the pipe to remain in a natural state for a predetermined period of time, optionally irradiating the preformed pipe with ultraviolet light to make the coating touch-dry and hard-dry at a normal temperature to obtain an inner coated pipe; and (iv) allowing the pipe to remain in the natural state for another predetermined period of time at the normal temperature, optionally baking the inner coated pipe at a temperature not higher than 250° C. to cure the coatings to obtain a finished product.

2. The method for manufacturing the exhaust pipe for the clean room according to claim 1, wherein the coatings are liquid during coating construction, and the coating is a solution, an emulsion, a solvent-free liquid mixture, or a suspensoid containing solid powder.

3. The method for manufacturing the exhaust pipe for the clean room according to claim 1, wherein the coatings and touch-dry temperatures of the coatings are not greater than 35° C.

4. The method for manufacturing the exhaust pipe for the clean room according to claim 1, wherein a post-cure method in step (iv) includes placing the inner coated pipe into a baking oven or a baking room, or introducing air into an interior of the inner coated pipe.

5. The method for manufacturing the exhaust pipe for the clean room according to claim 1, wherein the fluorinated alkene is a fluorinated alkene selected from any one or more of chlorotrifluor ethylene, tetrafluoroethylene, polyvinylidene fluoride, vinyl fluoride, hexafluoropropylene, trifluoroethylene, trifluorobromoethylene, trifluoropropene, hexafluoroisobutene, and octafluoroisobutylene.

6. The method for manufacturing the exhaust pipe for the clean room according to claim 1, wherein the metal is iron, aluminum, copper, or an alloy thereof.

7. An exhaust pipe for a clean room, comprising a preformed metal pipe having a surface treatment, a coating of a first component, and a coating of a second component on an inner part, wherein the second component comprises a copolymer of a fluorinated alkene and vinyl ether and a homopolymer of fluorinated methyl acrylate as a second basic film former.

8. The exhaust pipe according to claim 7, wherein the first component comprises phenyl siloxane, methyl polysilicate methyl ester, a siloxane monomer, a homopolymer of perfluoroalkyl, and a copolymer of perfluoroalkyl, or a combination thereof as a first basic film former.

9. The exhaust pipe according to claim 7, wherein the fluorinated alkene of the second component further comprises a fluorinated alkene selected from any one or more of chlorotrifluor ethylene, tetrafluoroethylene, polyvinylidene fluoride, vinyl fluoride, hexafluoropropylene, trifluoroethylene, trifluorobromoethylene, trifluoropropene, hexafluoroisobutene, and octafluoroisobutylene.

10. The exhaust pipe according to claim 7, wherein the coating is liquid during coating construction, and the coating is a solution, an emulsion, a solvent-free liquid mixture, or a suspensoid containing solid powder.

11. The exhaust pipe according to claim 7, wherein the coating and a touch-dry temperature of the coating are not greater than 35° C.

12. The exhaust pipe according to claim 7, wherein a post-cure treatment is performed on the inner part including placing the inner coated preformed metal pipe into a baking oven or a baking room, or introducing hot air into an interior of the inner coated pipe.

13. The exhaust pipe according to claim 7, wherein the exhaust pipe satisfies a requirement of FM4922, FM4910.

14. The exhaust pipe according to claim 7, wherein the metal is iron, aluminum, copper, or an alloy thereof.

* * * * *